J. D. Willoughby,
Turning Regular Forms,
Nº 3,950.  Fig. 1.  Patented Mar. 15, 1845.
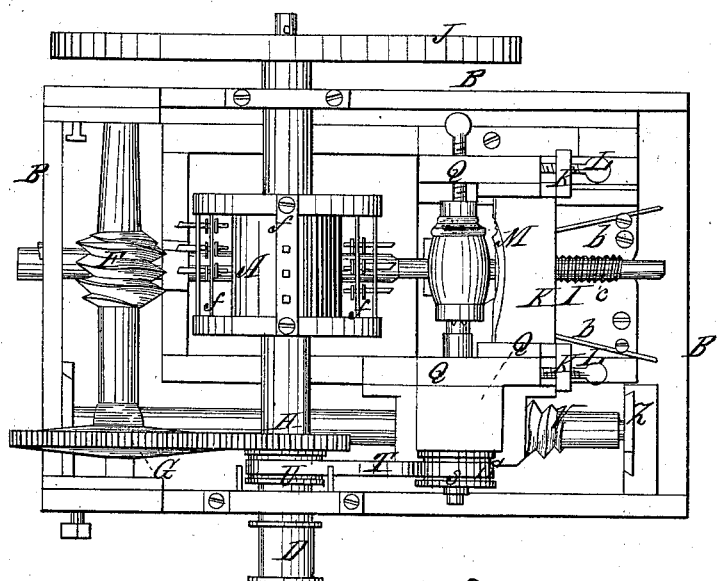
Fig. 2.
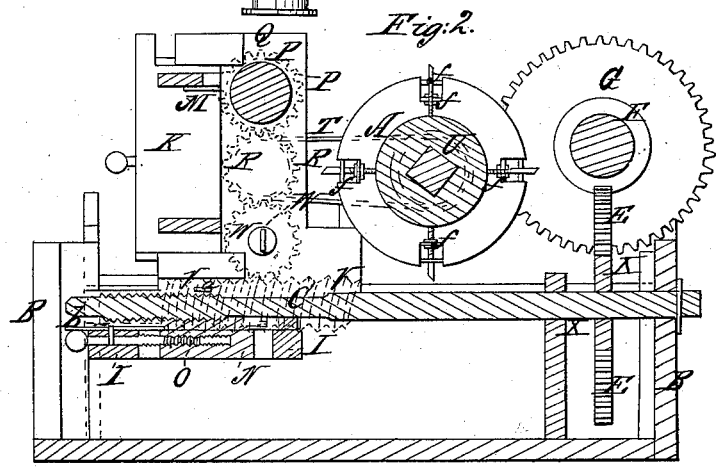
Fig. 3.
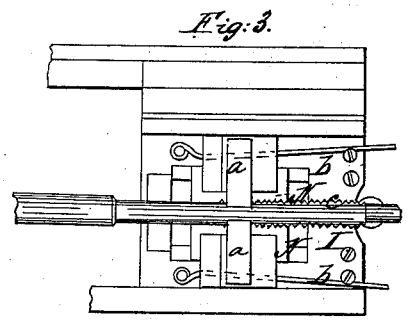

UNITED STATES PATENT OFFICE.

JAMES D. WILLOUGHBY, OF GETTYSBURG, PENNSYLVANIA.

MACHINE FOR TURNING WOOD, &c.

Specification of Letters Patent No. 3,950, dated March 15, 1845.

*To all whom it may concern:*

Be it known that I, JAMES D. WILLOUGHBY, of Gettysburg, in the county of Adams and State of Pennsylvania, have invented a new and useful Improvement in Machines for Turning, which is described as follows, reference being had to the annexed drawings of the same, making part of this specification.

Figure 1 is a top view of the machine. Fig. 2, is a side elevation. Fig. 3 is a horizontal section.

This machine consists of a revolving cylinder of cutters A arranged on a horizontal shaft passing through the center of the same and turning in boxes in a suitable frame B, said cutters being made to turn with great velocity while the substance to be reduced to the form required (such as hubs of wheels, posts of bedsteads, spokes, banisters, newel posts and other articles) is made to turn at a reduced speed and to advance gradually toward and against the cutters by means of a horizontal screw C turned by cogged and other gearing acting on the carriage containing the substance to be reduced. The said screw C for moving the carriage is turned by a cog wheel E into which a spiral thread F works formed on a horizontal transverse shaft carrying a cog wheel G that meshes into a cog wheel H on the shaft of the cutter cylinder A which is turned by a band passed around a pulley D on its end extending beyond the side of the frame said band leading from the driving power, a fly wheel J to equalize the motion being put on its opposite end. The substance to be turned or reduced and shaped is made to revolve by means of a cog wheel P on the horizontal shaft to which the substance to be turned is made fast which turns in the upright frame Q of the carriage aforesaid, said cog wheel being turned by another cog wheel R on a horizontal shaft on which there is a pulley S turned by a band T leading to a pulley U on the main shaft. Or the substance to be operated on may be turned by a horizontal revolving screw V working into an intermediate cog wheel W, said screw having a pinion X on it that meshes into the large cog wheel E turn by the gearing G, H first named, which screw may be thrown in or out of gear with the intermediate cog wheel at pleasure by raising or lowering a slide Z in which the gudgeon of the screw shaft turns, said slide being held in any position desired by a pin. The motion produced by the screw will be slow. That produced by the band T and pulleys S, U will be fast. The band and pulleys are used when the hub or post or other article is to be smoothed. The screw C is geared to the carriage by a female nut or vise nut *a a* divided in the center and attached to two levers *b b* by which they are brought together around the screw C for gearing them together and separated from the screw when required to be ungeared from it to stop the motion of the carriage.

The aforesaid two sections of the nut slide transversely in grooves in a small carriage or slide N having a longitudinal movement in grooves or on ways in the carriage I effected by a screw O passing through the end of the carriage I into the said slide N for the purpose of giving the nut more or less hold on the screw C in order to regulate the movement of the carriage and of the substance to be turned, that is to say its length of movement toward the revolving cutters A. The carriage with all its appendages moves on slides in the frame B.

There is a sliding frame K containing a smoothing knife M of the shape of the outer surface of the article to be turned for smoothing said article after it has been shaped by the revolving cutters arranged in uprights of the carriage and moved toward or from the article to be smoothed by horizontal screws L. When this cutter is used the band T must be adjusted on the pulleys S, U so as to cause the article to be turned and smoothed to revolve against the smoothing knife with great velocity.

The sides of the frame carrying the article to be turned may be widened or contracted at pleasure to admit larger or smaller articles to be operated on.

The cutters of the revolving cutting cylinder are shaped like a chisel on the cutting edge having about two thirds of their length made round and formed as a screw to receive nuts for securing and adjusting them to parallel bars *f f* placed near together and fastened to the periphery of circular flanges formed on the ends of the cylinder. These bars are perforated with round apertures in rows extending in spiral lines around the cylinder into which apertures the shanks of the cutters threaded as screws are inserted so that in cutting each cutter will revolve in its own circular track parallel with the others so that every part of the circumference of the article to be cut will be acted on by the cutters, no two cutters following in the same track. They are secured and adjusted by nuts put on their screw shanks between the parallel bars and between the cylinder and bars, there being two nuts for each cutter. The cutters may be of any required shape agreeably to the description of work required to be executed, such as gouges, chisels, bits and the like, and may be arranged nearer to or farther from the periphery of the cylinder as may be required, and they may be arranged to follow each other if preferred.

To turn masts for ships and other heavy articles the timber must be supported by and turn upon rollers or wheels by means of suitable gearing adpted to heavy work and the cylinder of cutters must be made to move over the timber lengthwise of its axis or transversely of the frame while it performs its simultaneous rotary movement effected by means of a screw or any suitable gearing.

What I claim as my invention and desire to secure by Letters Patent is—

1. Constructing the cylinder of cutters with parallel bars and spirally arranged cutters made adjustable with screws and nuts in the manner and for the purpose described.

2. I also claim the arrangement of the smoother M in combination with the rotating cutters.

3. I likewise claim the manner of adjusting the vise nut $a\ a$ for throwing the carriage in and out of gear with the screw C, by means of the slide and screw.

JAMES D. WILLOUGHBY.

Witnesses:
Wm. P. Elliot,
Edwin Maher.